April 13, 1926.

L. P. HYNES 1,580,251

SAFETY DEVICE FOR ELECTRIC MOTORS

Filed April 2, 1923  2 Sheets-Sheet 1

Inventor
LEE P. HYNES
By his Attorney
E. M. Bentley

April 13, 1926.

L. P. HYNES 1,580,251

SAFETY DEVICE FOR ELECTRIC MOTORS

Filed April 2, 1923    2 Sheets-Sheet 2

Inventor
LEE P. HYNES
By his Attorney
E. M. Bentley

Patented Apr. 13, 1926.

1,580,251

UNITED STATES PATENT OFFICE.

LEE P. HYNES, OF ALBANY, NEW YORK, ASSIGNOR TO CONSOLIDATED CAR-HEATING COMPANY, OF ALBANY, NEW YORK, A CORPORATION OF WEST VIRGINIA.

SAFETY DEVICE FOR ELECTRIC MOTORS.

Application filed April 2, 1923. Serial No. 629,408.

*To all whom it may concern:*

Be it known that I, LEE P. HYNES, a citizen of the United States, residing at Albany, in the county of Albany and State of New York, have invented certain new and useful Improvements in Safety Devices for Electric Motors, the following being a full, clear, and exact disclosure of the one form of my invention which I at present deem preferable.

In the use of an electric motor it is often desirable to relieve the motor in the event of an overload without resort to a fuse in the motor circuit. My invention relates to means for thus relieving the motor dependent on the magnitude of the torque which the motor is exerting. In particular, I interpose between the motor and the load which it is operating a spring which will yield in the event of the motor torque exceeding a determined maximum and thereby either break the motor circuit, or work the controller to reduce the amount of current in the motor below a dangerous amount. Together with the said spring I interpose a non-reacting gearing between the motor and the spring to prevent the reaction of the spring from working back on the motor shaft to reverse it mechanically when the current is cut off from it or so reduced that such reversal is possible. The importance of this will be recognized when it is remembered that the spring must have sufficient power or stiffness to drive the normal load without yielding, and therefore when the load is blocked the reaction of the spring will be equal to that of the excess torque of the motor required to compress the spring in an effort to overcome the block, or the excess load impressed by the block. I therefore provide that while the motor will drive its load through the intervention of the spring yet the reaction of the spring will be exerted against the load on one side and against a fixed abutment on the other side. By this means the motor is not only protected against an undue volume of current while attempting to move an overload, but also against the admission of current thereto when it is mechanically reversed and its own electromotive force added to the impressed electromotive force of its supply line.

For a detailed description of the present form of my invention, reference may be had to the following specification and to the accompanying drawings forming a part thereof, wherein:—

Figure 1:
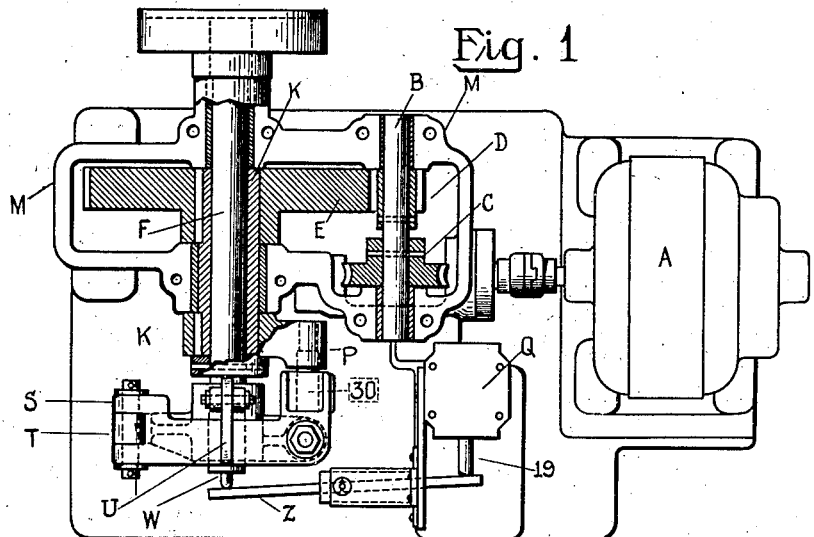
Figures 2, 4:
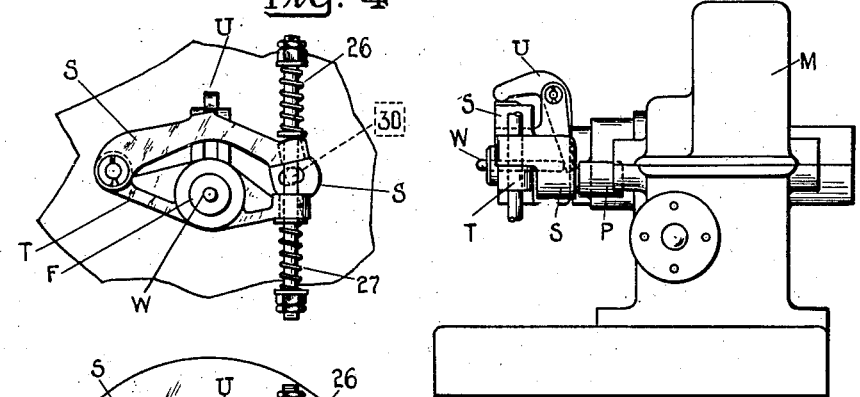
Figure 3:
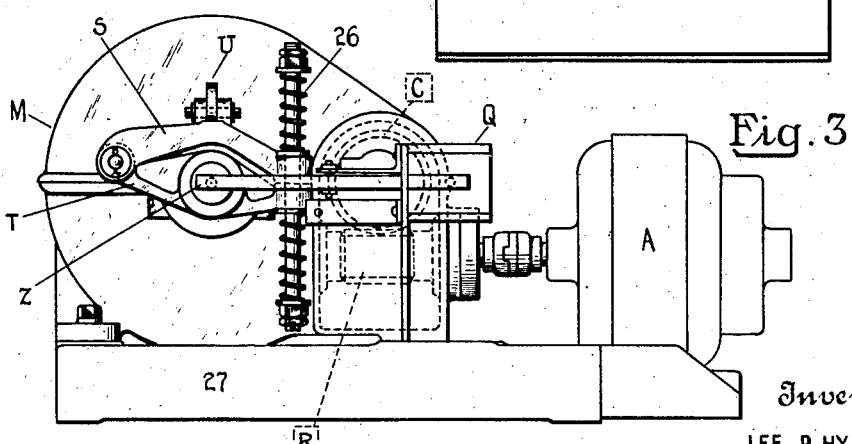
Figure 5:
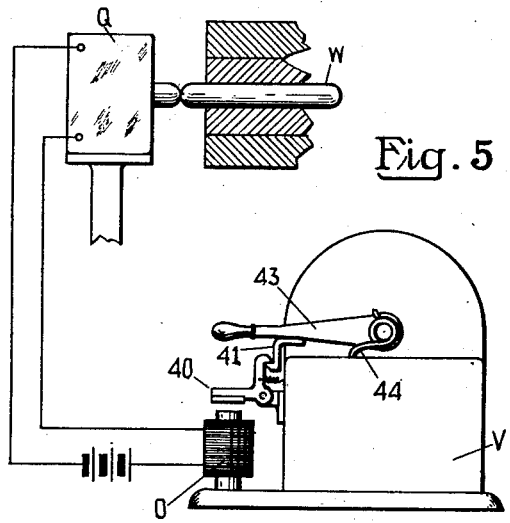
Figure 6:
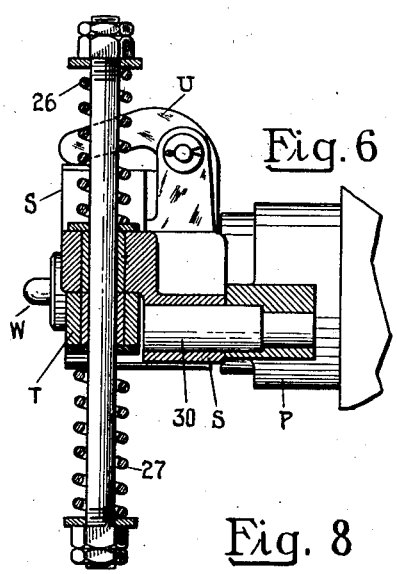
Figure 7:
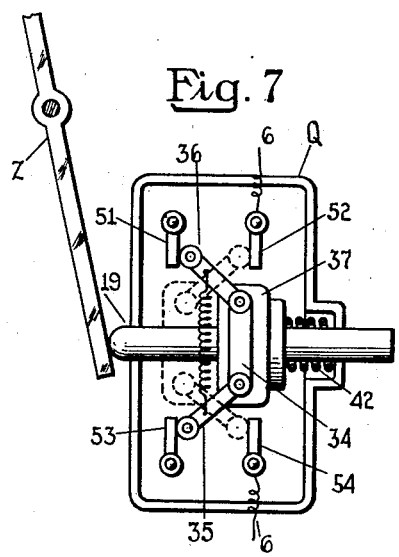
Figure 8:
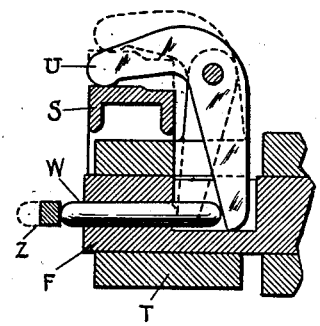

Figure 1 is a plan view of my apparatus in connection with the motor. Figure 2 is an end view of the apparatus with the motor removed. Figure 3 is a front view of Figure 1. Figure 4 shows the yokes in detail. Figure 5 illustrates a modification of the control of the motor rheostat. Figure 6 is an enlarged side view of the yoke and spring. Figure 7 illustrates the switch. Figure 8 is a detailed view of the switch operating pin.

Referring to Fig. 1 of the drawing, A represents an electric motor and F a load-shaft driven thereby. B is an intermediate countershaft carrying on the one hand a pinion D energizing a gear wheel E sleeved on the load-shaft, while, on the other hand, it carries a worm wheel C engaged by a screw R (see Fig. 3) on the motor shaft. These shafts are rigidly journalled in a casing-bed M. The sleeve on load-shaft F, on one end of which sleeve the said gear wheel E is mounted, appears at K. At its other end sleeve K carries a radial arm P from the face of which (see Figs. 1 and 6) projects a pin 30 that enters a radial slot in one end of a loose yoke S pivoted at its other end to a fixed yoke T on the load-shaft F. At their unpivoted ends these yokes S and T are connected by springs 26—27 on a rod passing through openings in the respective yokes. As the yokes spread apart they compress springs 26 and 27. Obviously the sleeve K, through radial arms P and pin 30, drives the free end of loose yoke S which drags after it the corresponding end of yoke T fixed to load-shaft F, with such spacing therefrom as may be permitted by the yielding of springs 26—27. These springs are so stiff that, under normal working conditions the two yokes are held closely together, but in the event of an excess load, or a load which is blocked, the springs will yield and the motor torque will draw the end of yoke S away from the adjacent end of yoke T. When the block or overload is removed, the compressed springs 26 and 27 tend to react to regain their normal condition. On one side this reaction is against the load but on the other hand it brings up against the worm wheel and screw, the latter having a fixed bearing that secures it against longitudinal thrust. In this way the spring may rotate the load-shaft but not the motor shaft as it regains its normal condition. I utilize this aforesaid separating movement of the two yokes to cause a rupture of the motor circuit, or a throw-back of the controlling rheostat of the motor, for the purpose of eliminating or reducing the amount of current flowing through the motor. Since the amount of current in the motor automatically increases as the motor slows down under its excess load, the motor striving to maintain its operation of that load, this current increase may become sufficient to burn out the motor. Usually this is prevented by a fuse in the motor circuit which will melt and break the circuit when the current increases to a certain magnitude, but such a fuse is objectionable for various reasons. I therefore produce the relief of the motor by the agency of the aforesaid separating movement of the two yokes S and T in response to the excess torque which the motor is exerting. I do this by the following means: An angle-switch controlling lever U is pivoted in the fixed yoke T with one arm extending over the loose yoke S and its other end reaching down (see Fig. 8) into a slot in the load-shaft F. There this depending arm of lever U bears against one end of a push-rod W which extends axially through and projects from the end of the load-shaft against a switch-operating lever Z. Of course the two yokes aforesaid are in constant rotation together with the load-shaft, but since the push-rod W is at the axis of such rotation there is no material friction between it and the stationary lever Z. This device also avoids the need of sliding contacts, or flexible conductors such as would be required if the control switch for the motor were mounted on the rotating parts.

Fig. 7 shows a switch Q operated by the lever Z, such as would be suitable if the motor circuit is to be ruptured. In this Fig. 7, a slide-rod 19 is shown which is forced to the left by a spring 42 and to the right by lever Z. On rod 19 is an insulating block 37 to which are pivoted the toggle-levers 35 and 36. These levers are drawn together by a spring and connected electrically by a plate 34. In the drawing the two levers 35, 36 bear respectively on the stationary dead contacts 51, 53, the slide-rod 19 being forced to the right by lever Z and the motor circuit 6—6 being open at contacts 52, 54. When, however, the lever Z is in its normal position, following its expansion by a release of the overload and the resumed rotation of the load-shaft, the spring 42 will force rod 19 to the left and when the toggle-levers pass the dead-center position they will snap across into contact with 52, 54, closing the motor circuit 6, 6. They will have a similar but reverse snap action in the reverse operation of breaking the motor circuit.

In Fig. 5 the push-rod W operates a switch Q directly to open and close the circuit of a magnet O which acts to release the handle 43 of a motor controller V. The handle 43 is moved to its circuit-closing position against a spring 44 and carries a hook 41 engaged by a latch 40. In the event of an overload the push-rod W will operate switch Q to close the circuit of magnet O which will thereupon unlatch arm 43 and allow spring 44 to throw the controller to its circuit opening position. In like manner the magnet O may be used to work a clutch or belt-shifter. In any case the springs 26—27 cannot react backward against the motor-shaft to reverse it. They can, however, react forward against the load, in the event of the overload or block being removed. In that event the push-rod W will be retracted and, in the arrangement of Fig. 7, that will result in the automatic re-closure of the motor circuit permitting the motor to resume its operation of the load under restored normal conditions. But in the arrangement of Fig. 5, it will be necessary to manually re-start the motor by the controller handle 43. Thus the resumption can be either automatic or manual as the conditions may require, but will still be dependent on the release of the overload, not on the release of the motor.

What I claim as new and desire to secure by Letters Patent is:

1. A safety device for an electric motor comprising a load shaft, a drive shaft, a fixed yoke secured to the load shaft, a movable yoke having one end pivoted to the fixed yoke, means connecting the free end of the movable yoke with the drive shaft, and a spring reacting against the said free end of the movable yoke.

2. A safety device for an electric motor comprising a load shaft, a drive shaft, a fixed yoke secured to the load shaft, a movable yoke having one end pivoted to the fixed yoke, means connecting the free end of the movable yoke with the drive shaft, a spring reacting against the said free end of the movable yoke, and motor controlling means supported by the fixed yoke and operated by movement of the movable yoke.

3. A safety device for an electric motor comprising a load shaft, a drive shaft, a fixed yoke secured to the load shaft, a movable yoke having one end pivoted to the fixed yoke, means connecting the free end of the movable yoke with the drive shaft, a spring reacting against the said free end of the movable yoke, a stationary motor controlling switch, and an operating device for said switch supported by said fixed yoke and operated by movement of the movable yoke.

4. A safety device for an electric motor comprising a load shaft, a drive shaft, a fixed yoke secured to the load shaft, a movable yoke having one end pivoted to the fixed yoke, means connecting the free end of the movable yoke with the drive shaft, a spring reacting against the said free end of the movable yoke, an angle lever pivoted to said fixed yoke and having one arm lying in the path of movement of the movable yoke, and switch controlling means actuated by said lever.

5. A safety device for an electric motor comprising a load shaft, a drive shaft, a fixed yoke secured to the load shaft, a movable yoke having one end pivoted to the fixed yoke, means connecting the free end of the movable yoke with the drive shaft, a spring reacting against the said free end of the movable yoke, an angle lever pivoted to the fixed yoke and having one arm lying in the path of movement of the movable yoke, and a switch actuating push rod engaged by the other arm of said lever.

6. A safety device for an electric motor comprising a load shaft, a drive shaft, a fixed yoke secured to the load shaft, a movable yoke having one end pivoted to the fixed yoke, means connecting the free end of the movable yoke with the drive shaft, a spring reacting against the said free end of the movable yoke, a switch actuating push rod axially mounted in the load shaft, and means operated by one of said yokes for actuating said push rod.

7. A safety device for an electric motor comprising a load shaft, a drive shaft, a fixed yoke secured to the load shaft, a movable yoke having one end pivoted to the fixed yoke, means connecting the free end of the movable yoke with the drive shaft, a spring reacting against the said free end of the movable yoke, a switch actuating push rod axially mounted in the load shaft, and an angle lever having one arm engaging the push rod and the other arm engaging said movable yoke.

8. A safety device for an electric motor comprising a load shaft, a drive shaft, a fixed yoke secured to the load shaft, a movable yoke having one end pivoted to the fixed yoke, means connecting the free end of the movable yoke with the drive shaft, a spring reacting against the said free end of the movable yoke, a switch actuating push rod axially mounted in the load shaft, and an angle lever pivoted to said fixed yoke and having one arm engaging the push rod and the other arm engaging said movable yoke.

9. A safety device for an electric motor comprising a load shaft, a concentric sleeve-like drive shaft, a fixed yoke secured to the load shaft, a movable yoke having one end pivoted to the fixed yoke, means connecting the free end of the movable yoke with the drive shaft, and a spring reacting against said free end of the movable yoke.

10. A safety device for an electric motor comprising a load shaft, a sleeve-like drive shaft enclosing the load shaft and provided with a radial arm, a fixed yoke secured to the load shaft and connected with said radial arm, a movable yoke having one end pivoted to the fixed yoke, and a spring reacting against the free end of the movable yoke.

11. A safety device for an electric motor comprising a sleeve-like drive shaft, a load shaft located within the drive shaft and having one end extending beyond the contiguous end of said drive shaft, a fixed yoke on said extended end, a movable yoke supported by the fixed yoke, a switch actuating push rod mounted in said extended end and means operated by the movable yoke for operating the push rod.

12. A safety device for an electric motor comprising a load shaft, a drive shaft, spring connected hinged yokes engaging the respective shafts, an axially mounted push rod, a motor controlling switch operated by said rod, and an actuating lever for said rod engaging one of said yokes.

13. A safety device for an electric motor, comprising a load-shaft, a second concentric shaft spring-connected thereto and driven by the motor through a worm gear, a stationary motor-controlling switch, and a concentric push rod for said switch concentrically mounted in one end of the load shaft and dependent on the angular relation of the two spring-connected shafts.

14. A safety device for an electric motor, comprising a load-shaft, a second shaft driven by the motor, two spring-connected yokes jointed together and connected to the said shafts respectively, and a motor-controlling switch, an actuator therefor dependent on the angular relation of said yokes, said actuator being supported by one yoke and positioned to be operated by the other yoke.

15. A safety device for electric motors comprising a load shaft, a spring interposed between elements respectively connected with the load shaft and the motor, a motor controlling switch, and an axially disposed push-rod for said switch dependent upon the reaction of said spring against the load shaft.

16. A safety device for an electric motor, comprising a load-shaft, a second concentric shaft driven by the motor through a worm gearing, hinged yokes connected to the respective shafts, a rod crossing the two yokes, springs on said rod compressed by the spreading apart of the yokes, a motor-controlling switch, and an operating device for said switch concentric with the two shafts and operable independently thereof, and means dependent upon the angular relation of said shafts for actuating said operating device.

17. A safety device for an electric motor, comprising a load-shaft, a second shaft concentric therewith driven by the motor, a yoke fixed to the load-shaft and extending transversely thereto, a second yoke hinged to the first one and having an offset connection with the second shaft, a spring tending to hold the two yokes together, a motor-controlling switch, and an operating device therefor dependent on the spreading apart of the yokes.

Signed at Albany, in the county of Albany and State of New York, this 29th day of March, 1923.

LEE P. HYNES.